(12) United States Patent
Freiheit et al.

(10) Patent No.: US 7,634,511 B1
(45) Date of Patent: Dec. 15, 2009

(54) USER INTERFACE FOR VIEWING LOGICAL REPRESENTATION OF A DATABASE BACKED UP BY A DATABASE RECOVERY MANAGER

(75) Inventors: Kirk Hartmann Freiheit, Seattle, WA (US); Ynn-Pyng Anker Tsaur, Oviedo, FL (US); Sunil Shah, Fremont, CA (US); Milin Desai, Sunnyvale, CA (US); Mohammed Eliyas N. A. Shaikh, Pune (IN); Sujatha Sivaramakrishnan, Hyderabad (IN)

(73) Assignee: Symantec Operating Corporation, Mountain View, CA (US)

( * ) Notice: Subject to any disclaimer, the term of this patent is extended or adjusted under 35 U.S.C. 154(b) by 265 days.

(21) Appl. No.: 11/541,041

(22) Filed: Sep. 29, 2006

(51) Int. Cl.
G06F 7/00 (2006.01)
G06F 17/00 (2006.01)
G06F 12/00 (2006.01)
G06F 17/30 (2006.01)
G06F 13/00 (2006.01)
G06F 13/28 (2006.01)

(52) U.S. Cl. .................. 707/202; 707/204; 707/102; 711/102; 715/968

(58) Field of Classification Search .......... 707/202, 707/204, 102; 711/102; 715/968
See application file for complete search history.

(56) References Cited

U.S. PATENT DOCUMENTS

2004/0167942 A1* 8/2004 Oshinsky et al. ............ 707/204

2005/0108486 A1* 5/2005 Sandorfi ..................... 711/162

OTHER PUBLICATIONS

"Legato Networker™ Module for Oracle®, *Release 4.2 Multiplatform Version Administrator's Guide*," Jul. 11, 2005, Copyright © 2003-2005 EMC Corporation, pp. 1-270.
Curtis Preston, "Veritas Raises the Bar with NetBackup 4.5," Storage Magazine, Oct. 2002 Issue, http://storageMagazine.techtarget.com/magItem/0,291266,sid35_gci856662,00.html Copyright © 2001-2004, TechTarget, pp. 1-3, printed Dec. 13, 2006, http://storagemagazine.techtarget.com/magPrintFriendly/0,293813,sid35_gci85662,00.ht....
"Time Navigator for Oracle, *Advanced Automated Data Protection Solution for Oracle*," © 2001-2004 Atempo, www.atempo.com, pp. 1-2, May 2004.
"BrightStor® ARCserve® Backup r11.1 for Windows Agent for Oracle," © 2004 Computer Associates International, Inc. (CA), pp. 1-4.
"NetVault, APM/Plugin User's Guide for the Oracle RMAN APM," BakBone Software, Software Copyright © 2005 BakBone Software, Documentation Copyright © 2005 BakBone Software, pp. 1-59.
Steven Hill, "A Time Machine for Your Data, *Atempo's Scalable and Affordable Time Navigator Enterprise Edition Backup Tool Works With Almost Any Platform*," Network Computing® For It By It, Apr. 14, 2005/www.nwc.com, Copyright © 2005 by CMP Media, LLC, pp. 1-2, Reprinted from Network Computing with permission .5821.

* cited by examiner

*Primary Examiner*—James Trujillo
*Assistant Examiner*—Bruce M Moser
(74) *Attorney, Agent, or Firm*—Campbell Stephenson LLP

(57) ABSTRACT

Various methods and systems for presenting a logical view of a database backup are disclosed. One method involves querying a database recovery manager for logical identifiers that correspond to physical backup pieces generated during a backup. The method uses the logical identifiers to display a backup view to a user. The backup view identifies logical database components that are available to be restored.

18 Claims, 8 Drawing Sheets

```
[ ] SERVER                                                              500
    [ ] C:
    [ ] Databases
            [#] DB_1
                    [#] Online Database View
                            [#] Table Spaces
                                    [#] T1
                                            [ ] D1
                                            [ ] D5
                                    [#] T2
                                            [ ] D2
                                    [#] T3
                                            [ ] D3
                                            [ ] D4
                    [#] Historical Database View
                            [#] Control File [date range]
                                    [#] Table Spaces
                                            [#] T1
                                                    [ ] D1
                                            [#] T2
                                                    [ ] D2
                                            [#] T3
                            [ ] Control File [date]
                            [ ] Control File [date]
```

FIG. 5

| Name | Size | Timestamp | SCN | 600 |
|---|---|---|---|---|

FIG. 6

| Handle | SCN | ResetLogChange# | Timestamp | TimeRange | 700 |
|---|---|---|---|---|---|

FIG. 7

USER INTERFACE FOR VIEWING LOGICAL REPRESENTATION OF A DATABASE BACKED UP BY A DATABASE RECOVERY MANAGER

FIELD OF THE INVENTION

This invention relates to databases and, more particularly, to backups and restores of databases that are performed using database recovery managers.

DESCRIPTION OF THE RELATED ART

Databases are used to organize information. Many organizations rely on databases to store information that is vital to their operation. In order to ensure that the information stored within the database will be protected against failure, organizations routinely generate backup copies of their databases.

Backing up a database is significantly more complicated than simply backing up a set of files. A database has a specific organization, and access to the information that controls how the database is organized is often restricted by the database management system. Accordingly, backups generated by third party backup programs often cannot efficiently provide information about the organization of the backed-up data.

In order to simplify the process of backing up a database, many database vendors have begun providing a recovery manager. This recovery manager interacts with the database management system as well as a third party backup program in order to create backups and to allow users to initiate restores. Because the recovery manager is built by the same database vendor that built the database management system, the recovery manager can be more effectively integrated with the database management system. This allows the recovery manager to efficiently gain access to information about the logical organization of the database and to provide a user interface that displays backups within this logical context.

While recovery managers can provide an enhanced user experience, the recovery managers tend to not provide the same scope of backup coverage as conventional backup products. For example, a dedicated backup program may have the ability to maintain years of backups as well as to provide users with immediate access to those backups. In contrast, a recovery manager may provide a user with access to only a few weeks or months of backups, even though the underlying backup program is still maintaining older backups. Accordingly, products that provide users with both an intuitive logical interface as well as full access to a range of backups are desired.

SUMMARY

Various embodiments of methods and systems for presenting a logical view of a database backup are disclosed. In one embodiment, a method involves querying a database recovery manager for logical identifiers that correspond to physical backup pieces generated during a backup. The method uses the logical identifiers to display a backup view to a user. The backup view identifies logical database components that are available to be restored.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

FIG. 5 is an example of a logical view of a database backup, according to one embodiment of the present invention.

FIG. 6 is an example of data file or table space information that can be presented to a user, according to one embodiment of the present invention.

FIG. 7 is an example of control file information that can be presented to a user, according to one embodiment of the present invention.

Figure 1:
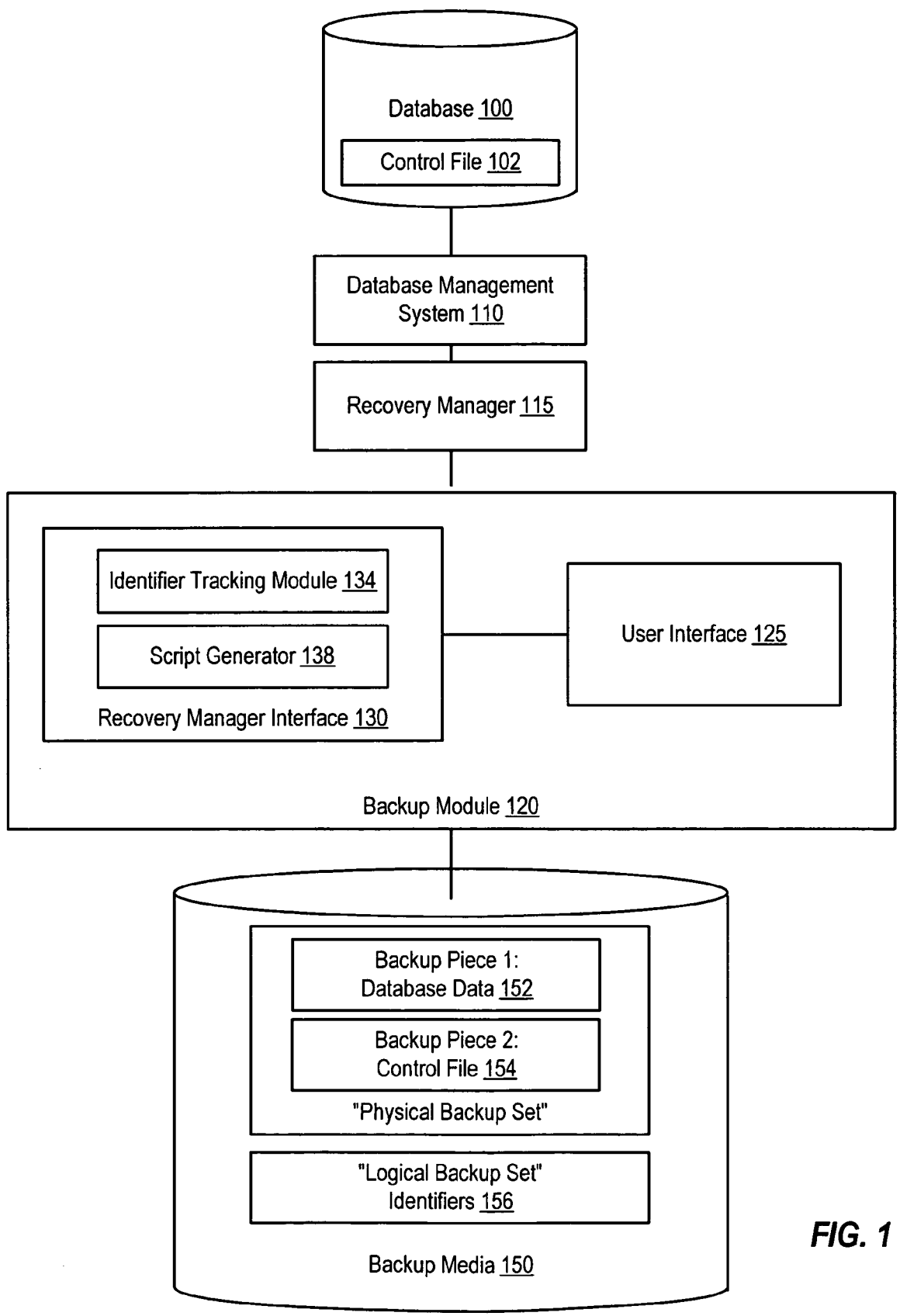
FIG. 1 is a block diagram of a system that performs backups and restores of a database, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a system that performs backups and restores of a database. As shown, access to data organized as a database 100 is managed by a database management system (DBMS) 110.

A recovery manager 115 is coupled to DBMS 110 (in alternative embodiments, recovery manager 115 may be integrated with DBMS 110). In one embodiment, DBMS 100 is an Oracle™ database management system and recovery manager 115 is Oracle™ Recovery Manager (RMAN), available from Oracle Corporation of Redwood Shores, Calif. Recovery manager 115 is configured to initiate backups and restores targeting database 100.

Recovery manager 115 stores its backup history (i.e., a history of backups whose performance involved recovery manager 115) in either control file 102 or in a manually created recovery catalog (not shown). Recovery manager 115 can only perform restores of information that is identified in the current backup history. Accordingly, even though third-party software, such as backup module 120, may maintain a backup history that is longer than recovery manager's history, the available information to immediately restore is limited to that identified by the recovery manager.

A backup module 120 is coupled to recovery manager 115. Backup module 120 is configured to generate backup copies of selected information. Backup module 120 can, for example, receive a request to perform a backup from recovery manager 115 and responsively generate a backup copy of information that is provided or specified by recover manager 115. In addition to including functionality for performing, maintaining, and cataloging backups, backup module 120 includes a user interface 125 as well as recovery manager interface 130. In one embodiment, backup module 120 is Backup Exec™, available from Symantec Corporation of Cupertino, Calif.

User interface 125 provides an interface via which a user can view information that has been backed up by backup module 120. A user can browse this information (e.g., according to a logical hierarchical view and/or according to the time at which the backup was generated) and select information to be restored.

Recovery manager interface 130 is configured to interact with recovery manager 115. In particular, recovery manager interface 130 includes an identifier tracking module 134 that is configured to obtain information usable to generate a logical view of a database that has been backed up by recovery manager 115. Recovery manager interface 130 also includes a script generator 138 configured to dynamically generate commands and scripts that cause recovery manager 115 to perform actions such as responding to queries and restoring information from a backup to database 100.

Backup media 150 is coupled to backup module 120. Backup media 150 can include any storage device such as, for example, one or more tapes, hard drives, compact discs (CDs) or digital video discs (DVDs), and the like, as well as one or more arrays of individual storage devices (e.g., an optical storage jukebox, a "Just a Bunch of Disks" (JBOD) array, or a Redundant Array of Independent Disks (RAID) system).

Figure 10:
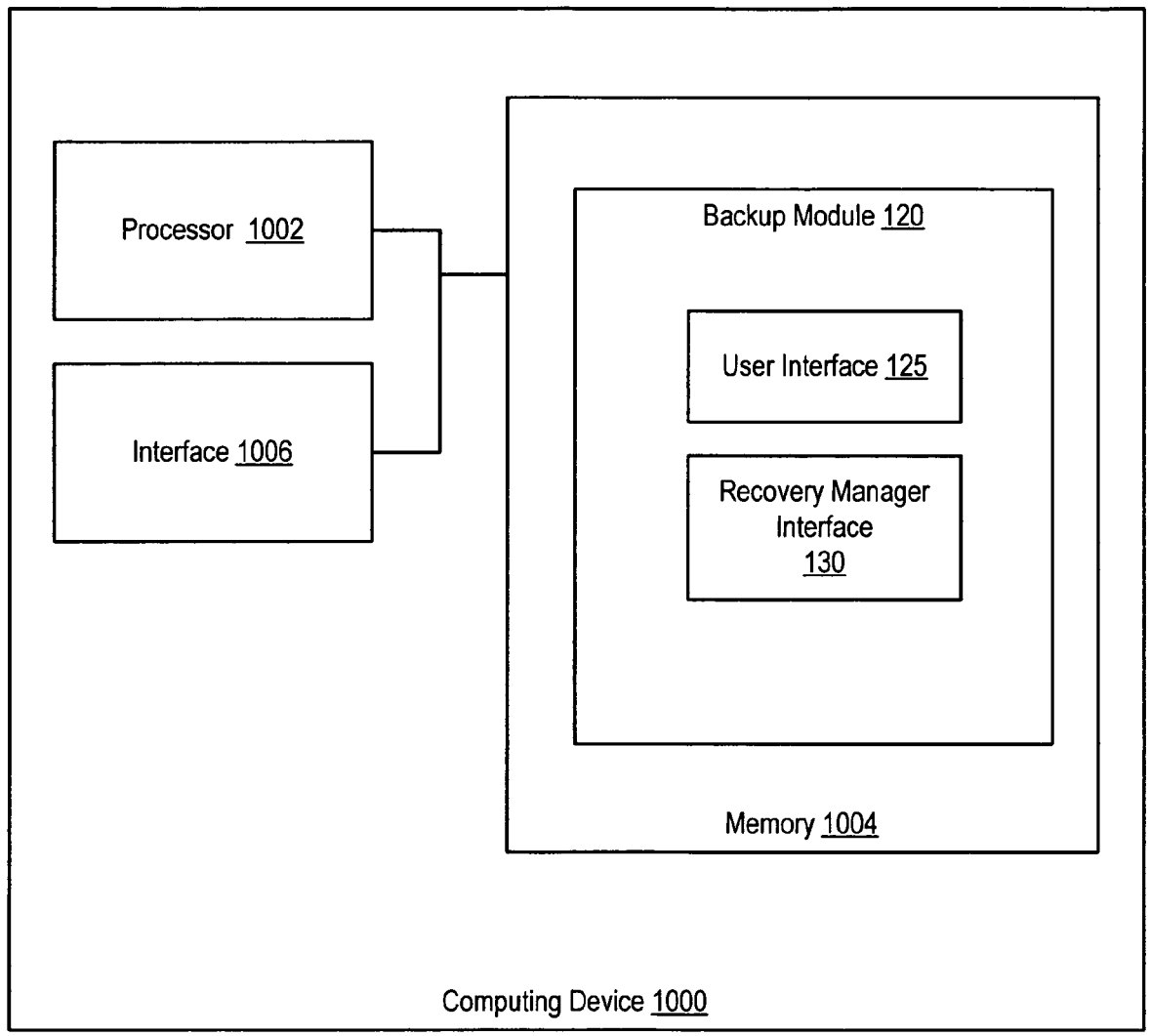
FIG. 10 is a block diagram of a computing device configured to generate a logical view of a database backup, according to one embodiment of the present invention.

Backup module 120 can be coupled to recovery manager 115 and/or backup media 150 by a network (not shown), including a WAN (Wide Area Network), such as the Internet, one or more LANs (Local Area Networks), and/or one or more SANs (Storage Area Networks). Backup module 120 can be implemented on a computing device (e.g., a personal computer, server, personal digital assistant, telephone, or the like), as shown in FIG. 10.

Backup media 150 stores two backup sets, Physical Backup Set and Logical Backup Set, that were generated by recovery manager 115. Whenever recovery manager 120 initiates a backup of database 100, that backup is stored as one or more physical backup sets, like the one shown in FIG. 1. The physical backup set includes one or more physical backup "pieces." Each backup set includes all backup pieces generated by the recovery manager during a single full or incremental backup. Each backup piece is a unit of data that is provided to backup module 120 by recovery manager 115 as part of a backup. Backup pieces are typically provided in a format that is specific to the recovery manager, while backup sets are typically stored in a format that is specific to the backup module.

When recovery manager 115 performs an incremental or full backup of database 100, the recovery manager will send one or more backup pieces to backup module 120. Backup module 120 will then store these backup piece(s) in one or more physical backup sets on backup media 150. Recovery manager 115 will provide a corresponding backup piece ID for each backup piece. Later, recovery manager 115 can restore the database information within a backup piece by providing the appropriate backup piece ID to backup module 120 along with a request to restore the identified backup piece. In response, backup module 120 will provide the corresponding backup piece to recovery manager 115, which will in turn complete the restoration. Thus, recovery manager 115 uses the backup piece IDs when communicating with backup module 120.

In this example, Physical Backup Set includes two backup pieces: Backup Piece 1, which includes database data 152, and Backup Piece 2, which includes control file 154. Backup Set 2 includes identifiers 156. Backup Pieces 1 and 2 are created when recovery manager 115 initiates a backup of database 100. Backup Piece 1 includes a backup copy of all or part of the actual user data stored in database 100. Backup Piece 2 includes a backup copy of the control file of database 100. Backup module 120 uses the physical backup piece IDs provided by recovery manager 115 to identify each backup piece within Physical Backup Set. It is noted that, in many situations, a single backup will generate more than two backup pieces; however, to simplify this example only two backup pieces are illustrated in FIG. 1.

In some embodiments, backup pieces are files that can each contain one or more backed up data files, control files, or archived logs. Thus, Backup Piece 1, Backup Piece 2, and Backup Piece 3 can each be a single file. A given backup piece can include multiple data files from within the database. For example, ten data files within a particular table space or set of table spaces can be combined into a single backup piece during a backup. However, in some embodiments, the same data file cannot be split among more than one backup piece. Similarly, in some embodiments, data files cannot be included in the same backup piece as either archived logs or control files.

In some embodiments, recovery manager 115 can perform backups using multiple channels (e.g., for improved performance). Each channel can write information to a different backup storage device. Each channel represents a stream of information that is being independently backed up. Since channels are independent of each other, a single backup piece will not be distributed across multiple channels; however, backup pieces that are sent to backup module 120 via different channels can be stored on different storage devices. As hits shows, in some embodiments, such as those in which recovery manager 115 uses multiple channels, backup sets may be distributed over several storage devices. Additionally, backup pieces in different backup sets can also be stored on different storage devices.

In addition to maintaining Physical Backup Set, backup module 120 can maintain one or more logical backup sets, such as the Logical Backup Set shown in FIG. 1, for each backup initiated by recovery manager 115. In one embodiment, Logical Backup Set includes logical identifiers (e.g., stored in identifiers 156) and/or a logical object view (e.g., a schema) that correspond to the backup pieces within the physical backup set(s) (e.g., Physical Backup Set in this example) generated during a backup. The logical identifiers identify the logical database components (e.g., data files, table spaces, control files, archived logs, and the like) that are contained within each physical backup piece generated during a backup.

In some embodiments (unlike the one shown in FIG. 1, which uses a single logical backup set), two logical backup sets are created for each backup. One logical backup set stores the logical identifiers that correspond to user database data (e.g., such as database data 152), while the other logical backup set stores the logical identifiers that correspond to the control file. Like the physical backup sets, each logical backup set may be distributed over multiple storage devices.

Additionally, in some embodiments, each time control file 102 is backed up, recovery manager interface 130 queries database 100 for the current schema, as well as the current time range in which restores are available via the recovery manager, at the point-in-time at which the control file is backed up. This information can also be stored as part of Logical Backup Set of FIG. 1. If multiple logical backup sets are maintained per backup, this schema information can be stored in either its own logical backup set or in a logical backup set associated with the control file.

In some embodiments, in order to query the database for the current schema, backup module 120 will need to have the proper authorization to access the database. In such a situation, the database can be configured with an account that corresponds to backup module 120. Backup module 120 can use its account credentials (e.g., as obtained from a configuration file) to log in to the database and perform the query. Alternatively, instead of having its own account, backup module 120 can query the user for the user's database credentials. Backup module 120 can then log in as the user to perform the query.

The identifiers 156 in Backup Set 2 are obtained by identifier tracking module 134. As Backup Pieces 1 and 2 are being written, identifier tracking module 134 keeps track of the backup piece identifiers (IDs) generated by recovery manager 115. These backup piece IDs can, in some embodiments, be stored as part of identifiers 156. In many embodiments, however, it is unnecessary for the backup module to maintain this information, since these backup piece IDs are also being maintained by the recovery manager.

At some point after the backup has completed, identifier tracking module 134 provides the collected backup piece IDs to script generator 138, which generates appropriate commands to query recovery manager 115 for the logical identifiers (e.g., control file IDs, archived log IDs, table space IDs, and data file IDs) corresponding to the backup piece IDs. Backup module 120 provides these commands to recovery manager 115. In some embodiments, the logical identifiers also include information (e.g., a timestamp) indicating when the corresponding logical database component was last backed up (e.g., when the corresponding backup piece was generated). FIGS. 6 and 7 provide examples of the logical identifier information that can be returned by the recovery manager.

When recovery manager 115 replies with the requested logical identifiers, identifier tracking module 134 stores the logical identifiers as part of identifiers 156. It is noted that identifier tracking module 134 does not need to associate each individual backup piece ID with its corresponding logical ID(s). For a control file, however, identifier tracking module 134 can store the physical backup piece ID as the "handle" of the control file (e.g., as shown in FIG. 7).

In one embodiment, the backup piece IDs provided by recovery manager 120 are maintained in the sequence in which the backup piece IDs are received. Recovery manager interface 130 then queries recovery manager 115 for the logical identifiers corresponding to those backup piece IDs in the same order. Querying the recovery manager in this order may improve performance in some situations.

In one embodiment, the logical backup set corresponding to a particular backup is organized in tree form. For example, a full database backup can be performed on a database that includes table spaces T1 and T2. T1 includes data file D11 and T2 includes data files D21 and D22. The full backup also includes the control file C1 of the database. The corresponding logical backup set for the backup will include logical identifiers C1, T1, D11, T2, D21, and D22. The logical identifiers can be organized within a tree. Nodes corresponding to the table space identifiers can be children of the node corresponding to the control file identifier C1. Similarly, the node corresponding to data file identifier D11 is a child of the node corresponding to table space identifier T1. Likewise, the nodes corresponding to data file identifiers D21 and D22 are children of the node corresponding to table space identifier T2.

The information in Logical Backup Set is useable by user interface 125 to present a logical view of the data within Physical Backup Set (such a logical view can also represent data from one or more other backup sets, if appropriate). This allows backup module 120 to provide users, who may not be familiar with the script generation techniques needed to control recovery manager 115, with a way to access backups that does not require the user to directly interact with recovery manager 115.

User interface 125 is configured to generate a logical view of the backup of database 100 that is stored in Backup Set 1 and to display the generated logical view to a user. To do so, user interface 125 accesses identifiers 156 stored in Backup Set 2. These logical identifiers can then be included in the logical view.

A logical view of a database backup is a set of information displayed to a user (e.g., as shown in simplified form in FIG. 5 below) that can include information identifying database components such as databases, table spaces, data files, control files, and archived logs, as well as the time(s) at which backups of those items were created. A given logical view can include database components whose backups are distributed over multiple storage devices, backup sets, and/or backup pieces (e.g., the view can display two components, each of which is backed up on a different storage device, or a single component that has multiple backups, each in a different backup set, available). The logical view hides physical information (e.g., such as the particular backup set, storage device, or backup piece that includes a logical component) from the user. This provides an understandable and easy to navigate interface.

The logical view is created from information stored by backup module 120 on backup media 150, such as logical identifiers 156, as well as information identifying the schema of the database. Current schema information can be obtained, at the time the backup is performed, by querying database 100 and/or recovery manager 115. Database 100 and/or recovery manager 120 can obtain this information from control file 102 and/or from a manually-created backup catalog (not shown).

In one embodiment, the logical view can include an online (or current) view as well as one or more historical views. The online view is based upon the current schema, the current range of time for which backups are available via the recovery manager, and the logical backup sets that are available within the current range of time. The online view can, in one embodiment, include only those logical database components that are both part of the current schema and included within logical backup sets created within the current time range. In other embodiments, the online view can also include logical database components that are part of the current schema but that have not yet been backed up. In this embodiment, the online view can prevent a user from selecting a full restore of a database or table space that includes non-backed up components. Additionally, the online view can identify those components that have not yet been backed up and allow the user to select those components for backup.

Still other embodiments can provide an online view that includes logical database components that were backed up in the current time range but that are not part of the current schema (e.g., because those components have been subsequently deleted). The online view can indicate that these components can only be restored from a historical view (if the recovery manager does not allow components that are not part of the current schema to be restored). Some embodiments may also combine features described above (e.g., some embodiments may display both deleted components and not-yet-backed-up components, in addition to displaying the backed-up components included within the current time range and current schema).

Historical views (e.g., as shown in FIG. 5 below) are used to provide users with access to all of the database backups maintained by backup module 120. The historical views identify all backed-up control files, the time range of backups associated with each backed up control file, and the database schema (in terms of, for example, table spaces and data files) that was in place when a respective control file was backed up. If a user needs to restore information from a point in time that is not available in the current incarnation of the database, the user can select the information to restore from the historical view provided by backup module 120. For example, if the user needs to restore a table space from three months ago, but the recovery manager only provides access to the most recent month of backups, the user can select the table space from a historical view provided by backup module 120. In response, backup module 120 can first generate a script that causes recovery manager 115 to restore the appropriate backed-up control file. Once the control file has been restored, the backup module 120 can generate a script that causes recovery manager to restore the specific table space selected by the user.

Figure 2:
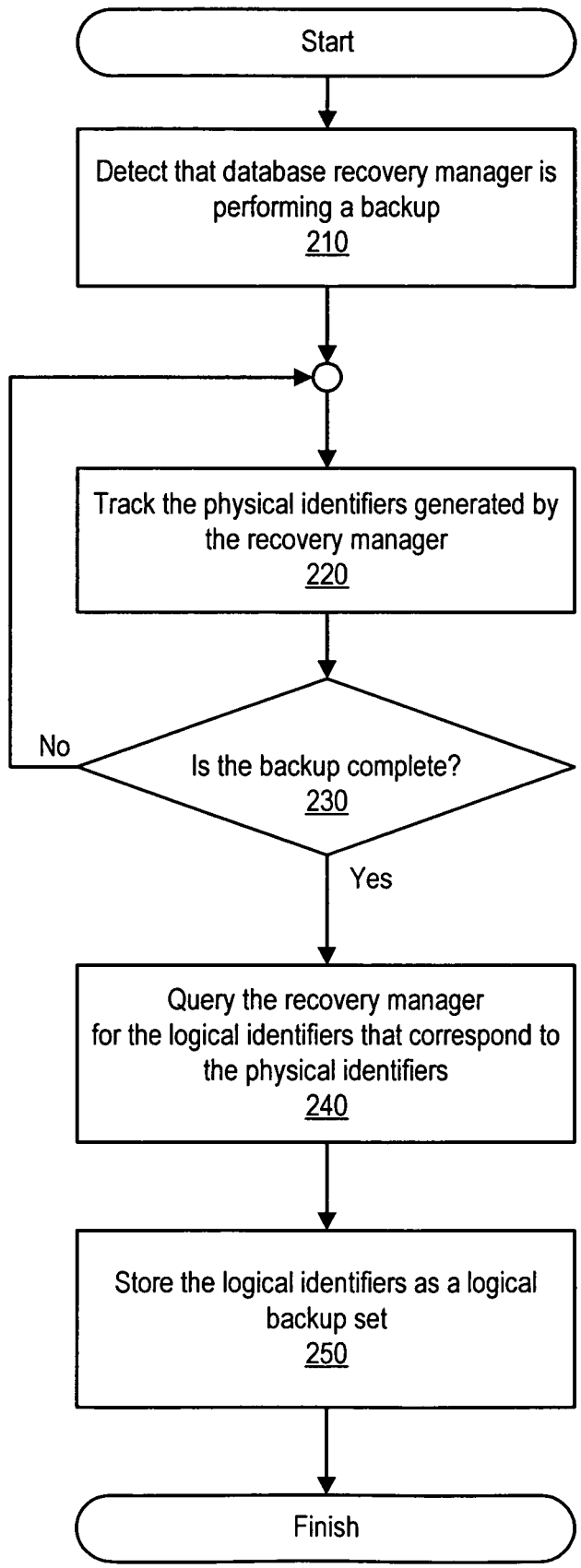
FIG. 2 is a flowchart of a method of performing database backups that are initiated by a database recovery manager, according to one embodiment of the present invention.

FIG. 2 is a flowchart of a method of performing database backups that are initiated by a database recovery manager. This method can be performed by backup module 120 of FIG. 1. In particular, this method can be performed by recovery manager interface 130.

The method begins at 210. If a database recovery manager is performing a backup of a database, as detected at 210, the backup module will track the physical identifiers (e.g., the backup piece IDs) generated by the recovery manager, as indicated at 220. The physical identifiers identify the physical units of data that the recovery manager provides to the backup module during the backup process. The backup module can track these identifiers as they are provided by the recovery manager, throughout the backup process. The backup can generate a full or an incremental backup of the database.

At some point after the backup has completed, as detected at 230, the backup module can query the recovery manager, as shown at 240, for the logical identifiers that correspond to the physical identifiers (which were obtained at 220). For example, in one embodiment, the backup module is configured to query the recovery manager for the logical identifiers corresponding to a particular backup as soon as that backup has completed. In other embodiments, a significant amount of time may elapse before the query is generated. For example, in one embodiment, the backup module may wait to query the recovery manager for the logical identifiers until a user actually requests to view backup(s) of the database. In either situation, the backup module can query the recovery manager by providing commands that specify each physical identifier tracked at 220 to the recovery manager.

Once the logical identifiers have been obtained, the backup module then stores these logical identifiers in a logical backup set, as shown at 250. The logical identifiers can later be accessed by the user interface when generating a logical view of the backed-up database.

Figure 3:
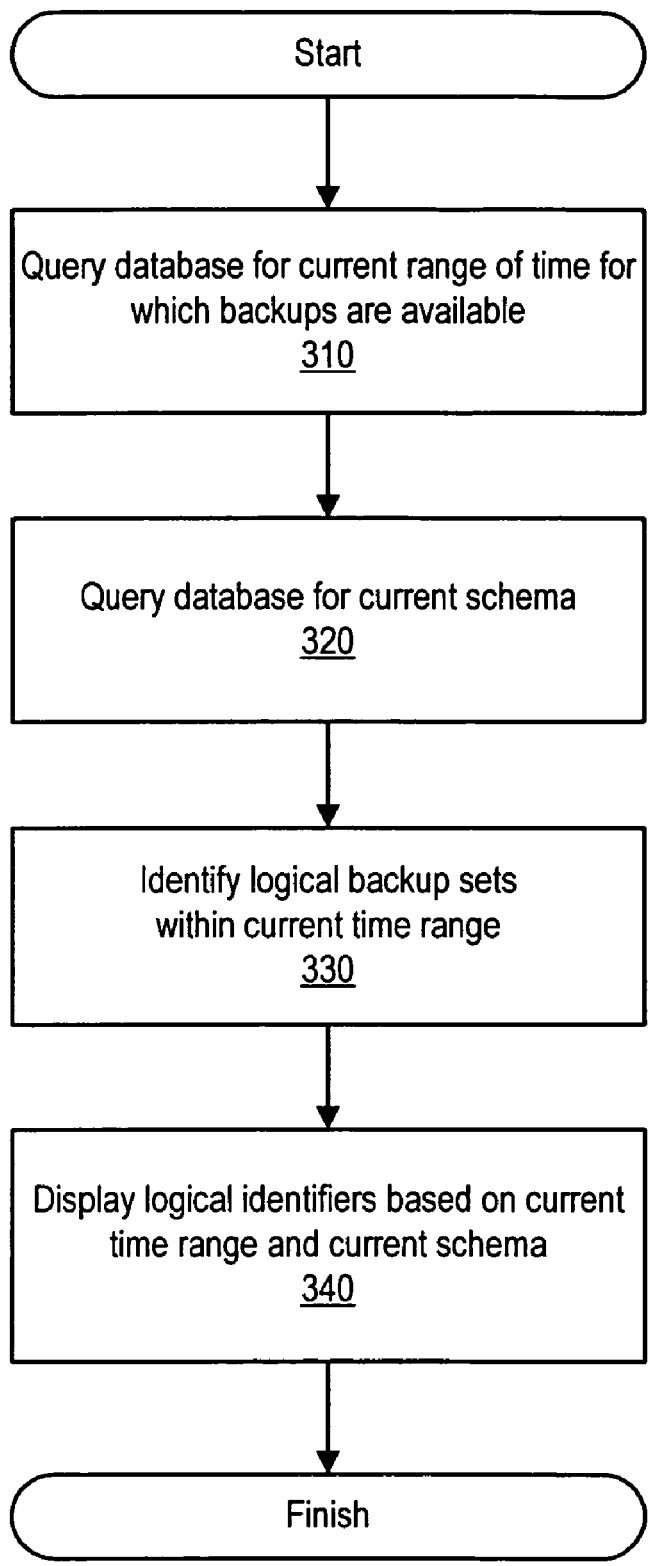
FIG. 3 is a flowchart of a method of presenting a logical view of an online database backup to a user, according to one embodiment of the present invention.

FIG. 3 is a flowchart of a method of presenting a logical view of an online database backup to a user. This "online" view presents a logical representation of the database backup (s) from which restores can be performed via the database's recovery manager. This method can be performed by a backup module such as backup module 120 of FIG. 1. All or part of the method can be performed in response to user input requesting to view a logical view of the backups of a particular database.

The method begins at 310, when the backup module queries the database for the current range of time for which databases are available via the database's recovery manager. It is noted that this range of time may differ from the range of time in which backups are available through the backup module itself (e.g., the database's recovery manager may provide access to only the last three months worth of backups, while the backup module provides access to the last two years worth of backups).

At 320, the backup module queries the database for the current schema, or organization, of the database. In some embodiments, the recovery manager only allows operations to be performed on database objects that are currently part of the online schema. Thus, an object that has been deleted from the database cannot be restored via the recovery manager. Accordingly, by identifying the objects that are within the current schema, the backup module can identify all of the objects that are potentially available to restore via the recovery manager. Other objects (even if included in the backup) may not be included in the logical view that is displayed to the user (however, some embodiments may instead choose to include such objects in the online view along with information indicating that those objects cannot be restored from the online view).

The backup module then identifies the logical backup set (s) that are within the current range of available backups, which was identified at 310. Each backup set is associated with or includes information that identifies when that backup set was created. If the creation time of a given logical backup set falls within the current range identified at 310, that logical backup set will be identified as being within the current time range.

Once the appropriate logical backup sets have been identified at 330, the backup module can identify the logical identifiers within those logical backup sets that identify database components within the current schema. The logical identifiers that correspond to the current schema and/or are part of logical backup sets in the current time range can then be displayed to a user, as shown at 340.

In some embodiments, only logical identifiers that are part of the logical backup sets in the current time range as well as part of the current schema are displayed. In other embodiments, certain other logical identifiers are also displayed, however. For example, identifiers of logical database components that have not yet been backed up (and whose identifiers are thus not part of a logical backup set) may also be displayed. Similarly, logical identifiers that are within the logical backup sets identified at 330 but that are not part of the current schema (e.g., because they identify deleted components) can also be displayed.

Thus, the backup module selects the logical identifiers to display based on both the current range of time for which backups are available via the recovery manager as well as the current schema of the database. The backup module can filter logical identifies based on both criteria (current time range and current schema). In some embodiments, both criteria are applied at substantially the same time, while in other embodiments, one criterion is applied before the other. For example, the available logical backup sets can be filtered based upon the current time range. The logical identifiers corresponding to the resulting logical backup sets, which are all within the current time range, can then be filtered based on the current schema.

Figure 4:
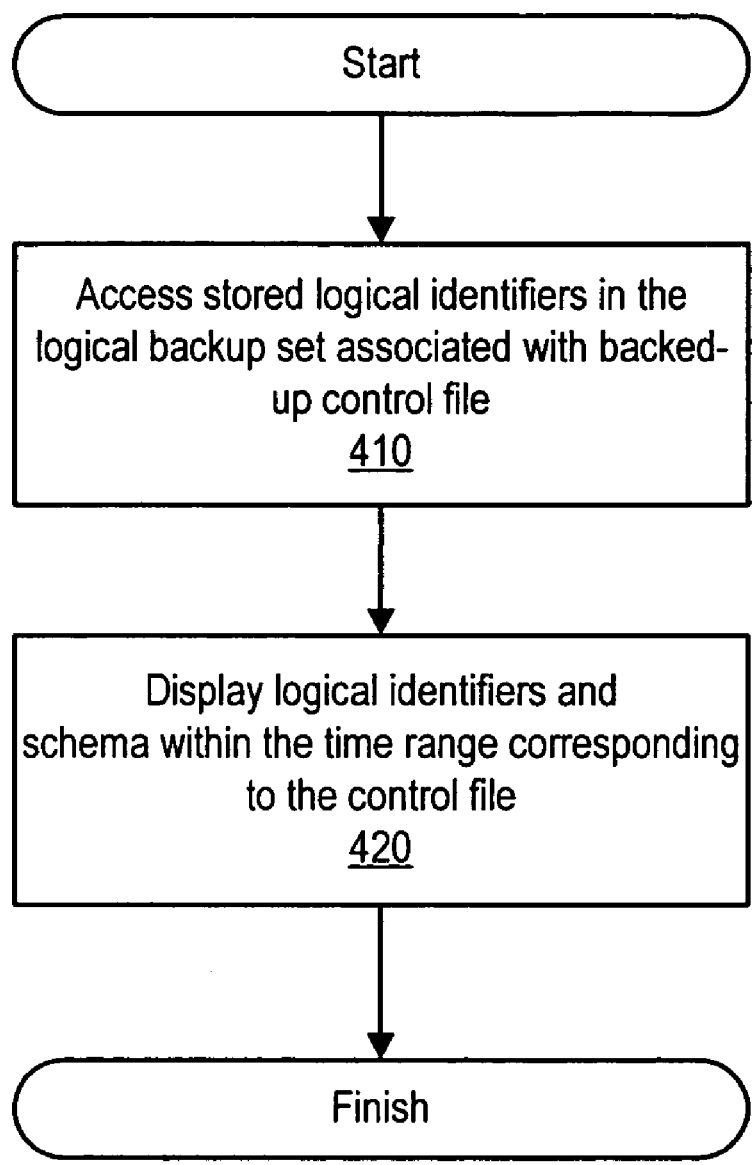
FIG. 4 is a flowchart of a method of presenting a logical view of a historical database backup to a user, according to one embodiment of the present invention.

FIG. 4 is a flowchart of a method of presenting a logical view of a historical database backup to a user. This "historical" view presents a logical representation of the database backup(s) from which restores can be performed via the backup module. This historical view differs from the online view generated by the method of FIG. 3 in that the backups shown in the historical view may not be restorable (at least immediately) via the database's recovery manager. This method can be performed by a backup module, such as backup module 120 of FIG. 1.

The method begins at 410, when the backup module accesses the logical backup set(s) associated with a backed-up control file. As noted above in the description of FIG. 2, whenever a database is backed up, both the user data and the current control file are backed up into respective backup pieces within a backup set (this information can also be stored in separate backup sets). After the backup, the backup module queries the recovery manager for the logical identifiers corresponding to the backed-up user data.

During or just subsequent to a backup of the control file, the backup module can query the database to obtain the current schema in place. Information describing the current schema can then be stored in the same logical backup set as the logical identifiers associated with the data or in a separate logical backup set associated with the control file. Accordingly, information about the schema that was in place when the control file was backed up is available as part of a logical backup set. This schema can be used to identify which logical components were part of the database at the time of backup.

The backed-up control file also contains information about the time range for which backups were available (using the database's recovery manager) at the point in time that the backed-up control file was backed up. This information can be used to select logical backup sets that fall within the time range. Once the logical identifiers included within both the control file's schema and the logical backup sets within the time range have been identified, the logical identifiers that satisfy both conditions can be displayed to a user. The logical identifiers can be displayed in a logical hierarchy that corresponds to the schema that was in place when the backed-up control file was the current control file.

The two views respectively generated by the methods of FIG. 3 and FIG. 4 differ in that the logical database components identified in the online view are immediately available to be restored via the recovery manager, while restoration of the logical database components identified in the historical view requires additional processing. In particular, to restore the logical database components in the historical view, the corresponding control file first needs to be restored. Once the control file has been restored, particular database components such as table spaces and data files can be restored.

FIG. 5 is an example of a logical view of a database backup, as provided by a user interface of a backup module (e.g., backup module 120 of FIG. 1). This logical view is presented to a user who wishes to view backups of a database. The logical view presents the logical database components (e.g., table spaces and data files) rather than physical components (e.g., backup sets and backup pieces), allowing the user to more easily locate desired information for restoration.

The logical view includes both an online view (e.g., generated according to the method of FIG. 3) and a historical view (e.g., generated according to the method of FIG. 4). This logical view is presented to a user by a user interface (e.g., user interface 125 of FIG. 1).

The logical view can provide users with a variety of options (not shown) for manipulating the displayed database components. Such options include restoring selected components. In some embodiments, users are provided with several different types of restore options, including restore to last transaction, recovery to point in time via timestamp or sequence number (SCN). Such options can be presented via a dropdown menu populated with values based on the object selected (e.g., if there are several backups of a particular table space, the timestamps and/or SCNs corresponding to those backups can be used to populate a dropdown menu).

As shown, logical view 500 corresponds to a database DB_1. When a user selects to expand DB_1 (e.g., by selecting an icon next to the database name, as indicated by the "#"), the user is presented with an option to view an Online Database View as well as one or more Historical Database Views.

When a user selects the Online Database View, the user interface presents the logical identifiers of components that have been backed up, are part of the current database schema, and are available for immediate restore via the database's recovery manager. The user interface presents these components by displaying the logical identifiers that are both within the current schema and within one or more logical backup sets generated within the appropriate time range. In some embodiments, the user interface can also present logical identifiers of components that are part of the current schema that have not yet been backed up (e.g., such components can be displayed in a special manner to indicate that no backups of such components are available) and/or logical identifiers of components that have been backed up but that are not part of the current schema (e.g., due to deletion). The latter logical identifiers, if displayed, can be displayed in a manner that indicates that the deleted components are not restorable via the online view.

In order to generate the Online Database View, the backup module can query a database for a current schema and time range (such information can be obtained from the current control file of the database). The user interface can then select appropriate logical backup sets based on the time range obtained from the database. The selected logical backup sets are logical backup sets that were generated during the time range provided by the database. The user interface can then identify the logical identifiers within these backup sets that correspond to logical components within the current schema. The resulting logical identifiers (as well as identifiers of logical components in the current schema that have not yet been backed up and/or that have been deleted, in some embodiments) are then displayed to the user.

In the example of FIG. 5, the Online Database View includes several table spaces T1, T2, and T3. Each table space can include one or more data files. Here, table space T1 currently includes data files D1 and D5. Table space T2 currently includes data file D2, and table space T3 currently includes data files D3 and D4.

A user can select any one or more of the table spaces and/or data files for restoration in the Online Database View. If such logical components are selected, the user interface will notify a recovery manager interface (e.g., such as recovery manager interface 130 of FIG. 1), which will in turn automatically generate the appropriate scripts to cause the recovery manager to restore the selected logical components. The recovery manager interface can use the logical identifier(s) of the selected component(s) when generating scripts for the recovery manager. Thus, the user can cause database components to be restored by simply browsing the current Online Database View. The user does not need to generate any scripts or have any knowledge about how the logical components are actually stored in the physical backup.

Also, as shown the Online Database View hides the details of how the physical backups are organized and stored from the user. The user is not presented with information about how the database components are divided into physical backup pieces or where the backed-up copies of different database components are stored. Similarly, components that were backed up by different backup operations and/or backup streams or channels can be displayed in the same Online Database View, and such components are not differentiated based upon physical information such as backup stream or channel. Thus, users see a simplified view that corresponds to the logical organization of the database, without having to wade through potentially confusing (and likely irrelevant) information about the physical organization of the backups being presented.

The Historical Database View presents the user with one or more historical views of the database. The Historical Database View includes one or more control files, each of which is a version of the database's control file that was backed up at a particular point in time. A date range (e.g., the range of dates from which backups can be performed via the recovery manager, if the corresponding control file is the online control file) can be associated with each control file. In the example of FIG. 5, each control file is associated with a date range in the Historical Database View.

If a user wants to restore information that is not available via the Online Database View, the user can browse the Historical Database View and, based on the date range information displayed next to each control file, select an appropriate control file. For example, if the user wishes to restore information that was deleted nine months ago, the user can browse the Historical Database View and select a control file that was backed up more than nine months ago.

Each backed-up control file contains the schema for the version of the database that was current at the time the control file was backed up. This schema, along with other information (e.g., such as stored logical identifiers contained in the logical backup set(s) created within the time range associated with the backed-up control file) can be used to generate a logical view of the database information that was backed up during the time range associated with the control file. As shown, a user can view backed up table spaces, as well as the backed up data files contained within those table spaces, if any. Thus, the Historical Database View allows a user to browse through different versions of the database and see logical representations of the backed up information available for each different version.

In this particular example, when the topmost control file was backed up, the database contained table spaces T1, T2, and T3 (these same table spaces are also present in the current database, as shown by the Online Database View). Table space T1 includes data file D1. Accordingly, between the time that the topmost control file in the Historical Database View was backed up and the current time, data file D5 has been added to table space T1.

In some embodiments, a user has two options when restoring information that is initially only available via the Historical Database View (in alternative embodiments, only one of these options, alone or in combination with other restore options, may be presented). One option allows the user to restore information via a two-step process, while the other option allows the user to restore information in a single step.

The two-step process involves a user performing two actions. First, the user selects a control file (e.g., based on date information associated with that control file) from the Historical Database View to be restored. In response to the user's selection, the backup module communicates a script containing information (e.g., a logical identifier and/or the physical backup piece ID or "handle") identifying the selected control file to the recovery manager, which in turn restores that control file.

Restoring a prior version of the control file has the effect of restoring the database schema to a prior state that existed when the prior version of the control file was backed up. Accordingly, when the restore is complete, if the user selects to view the Online Database View, the user will see a logical representation of the version of the database that was in use when the just-restored control file was originally backed up. The user can thus perform the second step of the two-step process by browsing the new Online Database View and selecting the desired database component(s) for restoration from that view. In response to the user's selection, the backup module interacts with the recovery manager (as described above) in order to restore the selected information. Thus, in the two-step process, the user first selects a backed-up control file from the Historical Database View, and then selects a backed-up database component from the Online Database View.

The single-step process involves the user selecting one or more database components (such as a table spaces, data files, and the like) associated with one of the control files in the Historical Database View. In response to the user's selection, the backup module interacts with the recovery manager to first restore the associated control file and then, after the control file is restored, to restore the selected database components. Accordingly, in this process, the user only has to make one selection to restore a backed-up database component that is not available in the current Online Database View. In response to the user's selection, the backup module will automatically perform both actions needed to restore the selected component.

In the example of FIG. 5, each database component is shown a single time in each logical view. However, it is noted that multiple versions of a component may be available in a single view. For example, the Online Database View can display several different backups of the same component, if all of those backups occurred within the time range from which restores can be performed via the recovery manager. For example, if the entire database was backed up at time t1, and then table space T1 was backed up individually (e.g., using a incremental backup operation) at time t2, then the Online Database View can display information indicating that multiple versions of table space T1 (and its components, data files D1 and D5, if both were present at both times t1 and t2) are available for restore. Each version can be identified by the time at which that version was backed up. A user can then use the timing information to select the desired version of the table space to restore.

Additionally, while the example of FIG. 5 only shows databases, control files, table spaces, and data files, it is noted that other database components can be displayed in a logical view. For example, archived logs and other components can also be displayed in the logical view.

Furthermore, as noted above, it is noted that the logical components displayed in a given logical view (e.g., a given online or historical view) may be displayed in a manner that is completely independent of the organization of the physical backup sets that include the backups of the logical components. For example, two table spaces within the same backed-up version of a database can be backed up in different physical backup channels, which can then be stored on different backup devices. However, despite actually being stored on different backup devices, the two table spaces will be displayed in the same logical view. This frees the user from needing to know anything about how the backups are physically organized. In other words, a user can find the information that the user needs to restore without knowing which storage devices, backup set, or backup piece actually holds the desired information.

FIG. 6 is an example of database component information that can be presented to a user. This information can be displayed, for example, if a user clicks on or otherwise selects a particular database component in a logical view. This information can be stored within a logical backup set in response to having been received from a recovery manager. As shown, information 600 includes a component name (e.g., the name of a table space, data file, archived log, or the like), a size (e.g., in bytes), a timestamp generated when the associated version of the component was backed up, and a sequence number (SCN). It is noted that other information can be included instead of and/or in addition to that shown here.

Sequence numbers, such as the SCN included in information 600, are numbers or other values that are generated in a controlled fashion (e.g., by incrementing or decrementing each time a prespecified event occurs). Sequence numbers can be used to determine the order of two events relative to each other. For example, if sequence numbers are integers that are generated by incrementing a base value over time, and if a particular event is associated with a higher sequence number than another event, the particular event can be determined to have happened later than the other event. Here, sequence numbers can be used to determine when two components were backed up, relative to each other.

FIG. 7 is an example of control file information that can be presented to a user. This information can be displayed, for example, when a user clicks on or otherwise selects a particular control file in a logical view. This information can be stored within a logical backup set in response to having been received from a recovery manager. As shown, control file information 700 includes a handle (which is the ID of the backup piece that stores this backed-up control file), SCN, a reset log change number (#), a timestamp, and a time range. The time stamp indicates the time at which the associated version of the control file was backed up, and the time range identifies the range of time from which components can be restored when the associated version of the control file is the online control file.

Figure 8:
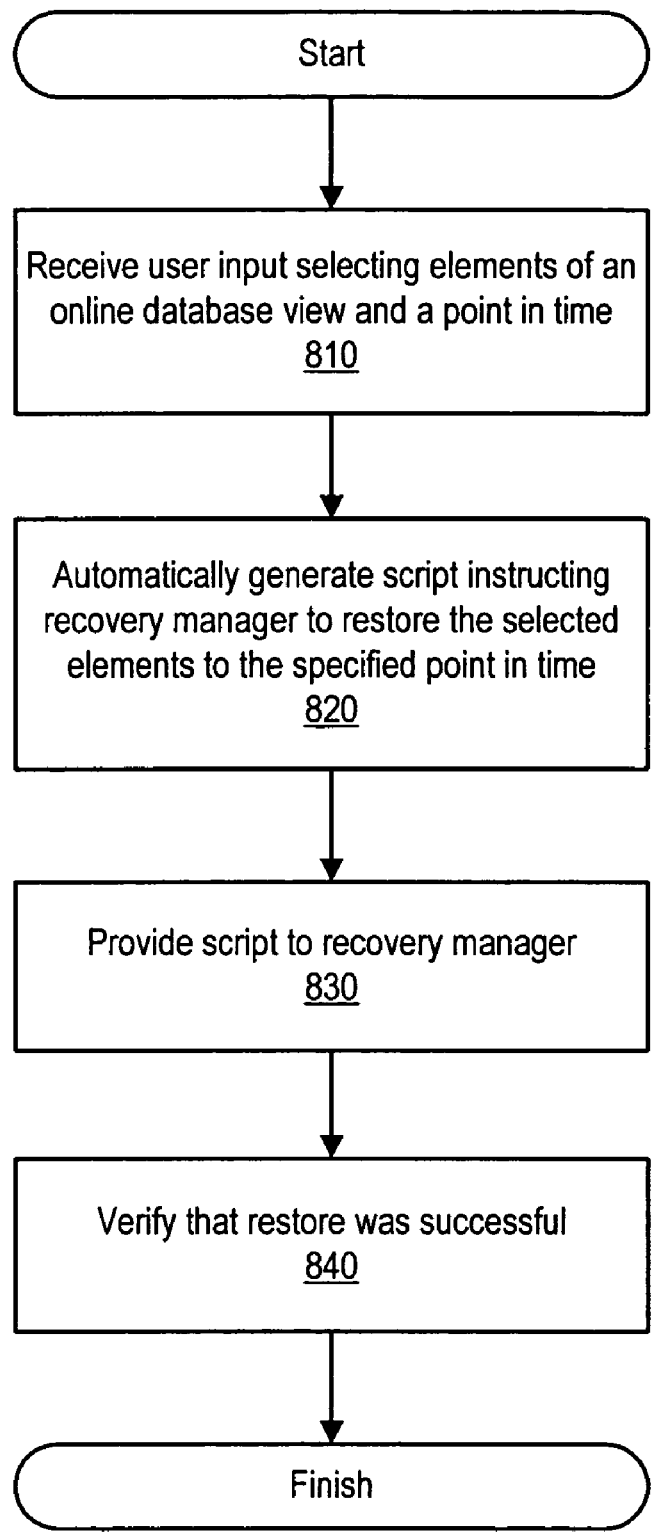
FIG. 8 is a flowchart of a method of performing a restore, based upon user input selecting a component of a logical view of a database backup, according to one embodiment of the present invention.
Figure 9:
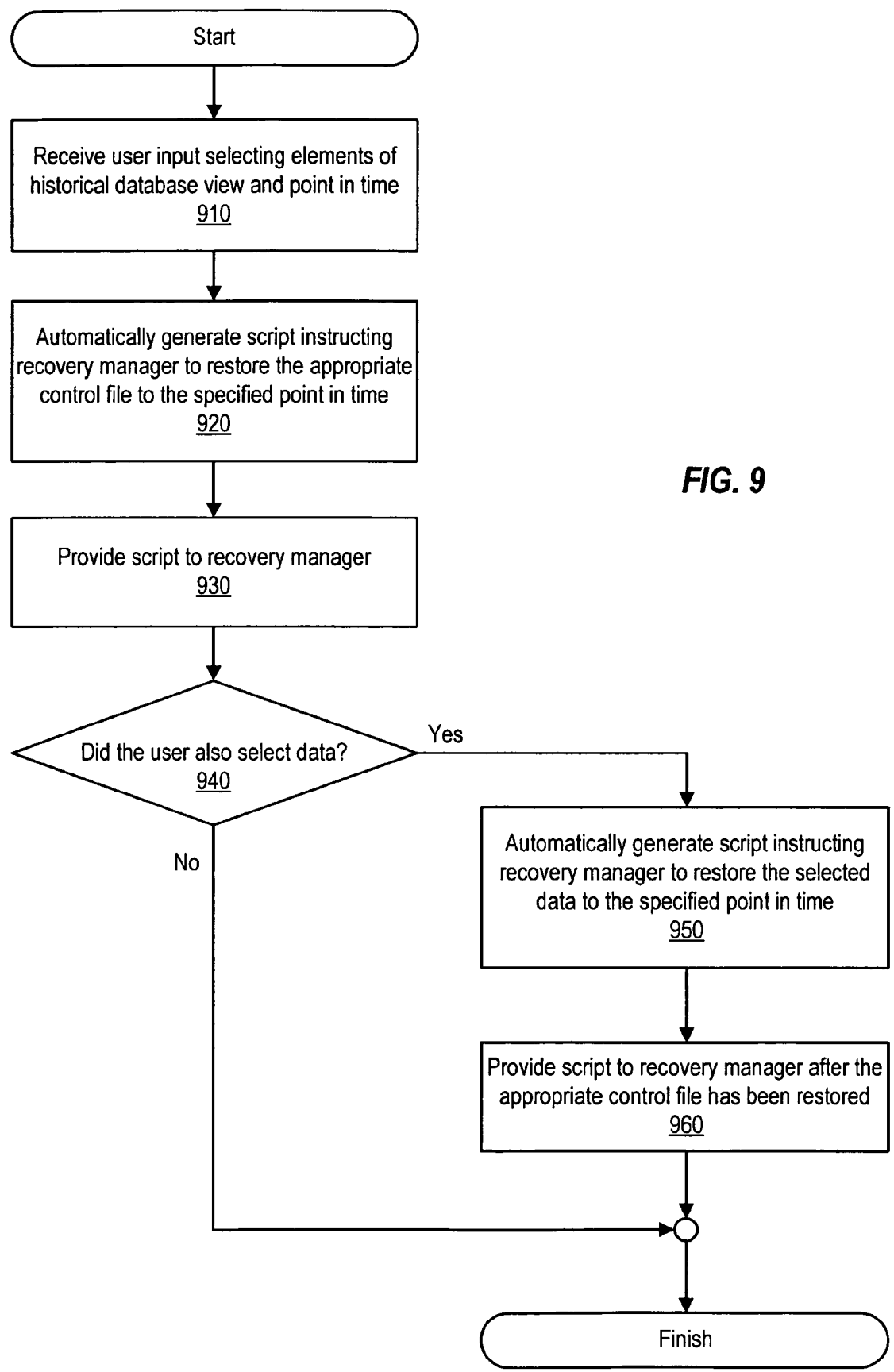
FIG. 9 is a flowchart of another method of performing a restore, based upon user input selecting a component of a logical view of a database backup, according to one embodiment of the present invention.

FIG. 8 is a flowchart of a method of performing a restore, based upon user input selecting an element of a logical view of a database backup. This method can be performed by a backup module, such as backup module 120 of FIG. 1. This method can be used to restore elements within an online logical view. FIG. 9 shows an example of a method of restoring elements selected from a historical logical view.

The method of FIG. 8 begins at 810, when user input is received. The user input selects one or more elements of an online database view as well as a point in time. A user can select the point in time can be specified by, for example, selecting a particular version of a database or database component, based upon timing information associated with that version. The point in time is then the time (indicated by the timing information) associated with that version of the database or database component. The user input can be received via a user interface, such as user interface 125 of FIG. 1, that displays a logical view of one or more databases for which backups are available. The user input received at 810 selects one or more elements of an online database view. Such elements can include whole databases as well as database components such as archived logs, table spaces, data files, control files, and the like.

At 820, a script is automatically generated. When executed, the script instructs a recovery manager to restore the elements selected at 810 to the point in time specified at 810. The script identifies the elements using logical identifiers. Operation 820 can be performed by a script generator such as script generator 128 of FIG. 1.

The script is provided to the recovery manager at 820 (e.g., using an appropriate application programming interface). This causes the recovery manager to restore the selected elements to the specified point in time. For example, in response to receiving scripts specifying a particular table space and a particular time, the recovery manager will access its internal information to obtain the physical identifier of the backup piece that contain the appropriate version of the table space. The recovery manager then provides the physical identifier to a backup module in order to obtain the backup piece. Once the recovery manager receives the backup piece containing the backup of the table space, the recovery manager restores the selected table space to the database.

After the recovery manager has executed the script (provided at 830), the backup module can verify that the restore was successful, as shown at 840. The backup module can verify the restore by, for example, querying the database or recovery manager. If the restore was not successful, the backup module can generate an error message or log or otherwise inform the user of an error.

In some embodiments, the backup module can verify that the restore will be successful prior to initiating the restore (e.g., function 840 can be performed before function 830), in order to prevent errors during the restore. In one such embodiment, verification is performed using the RESTORE VALIDATE command for Oracle™ RMAN. In response to receiving this command, RMAN simulates a restore and identifies the backup piece IDs needed to perform the restore. The backup module can then search its backup information for the identified backup piece IDs to determine which backup media each piece resides on. If the backup media is present, the backup module verifies the restore; otherwise, the backup module determines that the restore was not successful.

FIG. 9 is a flowchart of another method of performing a restore, based upon user input selecting a component of a logical view of a database backup. This method can be performed by a backup module, such as backup module 120 of FIG. 1. This method can be used to restore elements within a historical logical view. In this example, the method can be used to restore database components such as table spaces and data files directly from the historical logical view (as opposed to needing to first restore a control file from the historical logical view, and then selecting the desired database component from the new online database view that results from restoring the control file). It is noted that other embodiments can employ different methods for restoring elements of a historical logical view.

The method begins at 910, when user input selecting one or more elements of a historical database view as well as a point in time is received. A user can provide the user input by selecting one or more elements of a historical database view via a user interface. The user can select a point in time by either explicitly selecting a particular point in time or by selecting an element of the historical database view that is associated with the particular point in time.

At 920, the backup module automatically generates a script that instructs the recovery manager to restore the appropriate control file to the specified point in time. This script can identify the control file by the logical identifier or backup piece ID (or handle, as shown in FIG. 7) associated with the control file. The particular control file to restore is the control file that is associated with a range of time that includes the point in time specified at 910. The script is then provided to the recovery manager, as shown at 930. This in turn causes the recovery manager to restore the control file, which restores the schema of the database to the schema that was in place when the control file was backed up.

If the user input specified particular data within the database (e.g., by specifying an archived log, data file, and/or table space), as determined at 940, the backup module will additionally generate another script, as shown at 950, after the control file is restored. This script identifies database components by logical identifiers. This script, when executed, causes the recovery manager to restore the selected data to the specified point in time. This script is provided to the recovery manager, after the appropriate control file has been restored, as shown at 960.

FIG. 10 is a block diagram of a computing device configured to generate a logical view of a database backup. FIG. 10 illustrates how certain elements, such as backup module 120, can be implemented in software.

FIG. 10 is a block diagram of a computing device 1000. Computing device 1000 can be a personal computer, server, personal digital assistant, mobile phone, storage controller (e.g., an array controller, tape drive controller, or hard drive controller), or the like.

As illustrated, computing device 1000 includes one or more processors 1002 (e.g., microprocessors, PLDs (Programmable Logic Devices), or ASICs (Application Specific Integrated Circuits)) configured to execute program instructions stored in memory 1004. Memory 1004 can include various types of RAM (Random Access Memory), ROM (Read Only Memory), Flash memory, MEMS (Micro Electro-Mechanical Systems) memory, magnetic core memory, and the like. Memory 1004 can include both volatile and non-volatile memory. Computing device 1000 also includes one or more interfaces 1006. Processor 1002, interface 1006, and memory 1004 are coupled to send and receive data and control signals by a bus or other interconnect.

Interface 1006 can include a network interface to various networks and/or interfaces to various peripheral buses. Interface 1006 can also include an interface to one or more storage devices (e.g., backup media 150 of FIG. 1). Interface 1006 can, for example, generate a request to access (e.g., read or write) information stored on backup media 150 of FIG. 1.

In this example, program instructions and data executable to implement all or part of backup module 120 functionality, including user interface 125 and recovery manager interface 130, are stored in memory 1004. The program instructions and data implementing backup module 120 can be stored on various computer readable media such as memory 1004. In some embodiments, such software is stored on a computer readable medium such as a CD (Compact Disc), DVD (Digital Versatile Disc), hard disk, optical disk, tape device, floppy disk, and the like). In order to be executed by processor 1002, the instructions and data can be loaded into memory 1004 from the other computer readable medium. The instructions and/or data can also be transferred to computing device 1000 for storage in memory 1004 via a network such as the Internet or upon a carrier medium.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
 generating commands to query a database recovery manager;
 issuing the commands from a backup module to the database recovery manager wherein
  the commands request logical identifiers corresponding to one or more physical backup pieces generated during a backup of a database,
  each of the logical identifiers identifies a respective one of a plurality of logical database components, and
  the logical database components comprise at least one of a table space and a database control file;
 receiving the logical identifiers from the database recovery manager in response to the commands;
 generating a backup view based upon the logical identifiers, wherein the backup view identifies logical database components that are available to be restored from one or more backups generated during a backup period;
 receiving user input selecting one or more of the logical database components identified in the backup view and a time; and
 providing one or more of the logical identifiers and the time to the database recovery manager, wherein
  the one or more of the logical identifiers identify the selected one or more of the logical database components.

2. The method of claim 1, further comprising:
 issuing a first database query to the database requesting the backup period; and
 issuing a second database query to the database requesting a current database schema, wherein
  the backup period is a current backup period supported by the database recovery manager,
  the backup view is generated based upon the backup period and the current database schema, and
  the logical database components identified by the backup view comprise one or more components that were backed up during the current backup period and are part of the current database schema.

3. The method of claim 2, wherein
 the logical database components identified by the backup view further comprise one or more components that are part of the current database schema but have not yet been backed up.

4. The method of claim 2, wherein
 the logical database components identified by the backup view further comprise one or more components that were backed up during the current backup period but have been deleted from the current database schema.

5. The method of claim 1, further comprising:
 accessing information associated with a backed-up control file, wherein the information identifies the backup period.

6. The method of claim 5, further comprising:
 initiating restoration of the backed-up control file; and
 subsequent to restoration of the backed-up control file, performing the providing the one or more logical identifiers and the time to the database recovery manager.

7. The method of claim 6, wherein both the initiating and the providing are performed automatically in response to the receiving user input selecting the one or more of the logical database components and the time.

8. The method of claim 1, wherein
the backup view displayed to the user identifies a first logical component whose backup is stored on a first storage device and a second logical component whose backup is stored on a second storage device, and
the backup view does not include physical location information identifying the first storage device and the second storage device.

9. The method of claim 1, further comprising:
detecting that the database recovery manager is initiating a new backup of the database; and
creating one or more logical backup sets corresponding to the new backup, wherein the creating the one or more logical backup sets comprises:
generating second commands to query the database recovery manager;
issuing the second commands to the database recovery manager, wherein
the second commands request one or more second logical identifiers corresponding to one or more second physical backup pieces generated in the new backup; and
storing the one or more second logical identifiers in the one or more logical backup sets.

10. A computer program product comprising:
a computer readable medium storing program instructions executable to:
generate commands to query a database recovery manager;
issue the commands from a backup module to the database recovery manager, wherein
the commands request logical identifiers corresponding to one or more physical backup pieces generated during a backup of a database,
each of the logical identifiers identifies a respective one of a plurality of logical database components, and
the logical database components comprise at least one of a table space and a database control file;
receiving the logical identifiers from the database recovery manager in response to the commands; and
generate a backup view for display to a user, based upon the logical identifiers, wherein
the backup view identifies logical database components that are available to be restored from one or more backups generated during a backup period;
receive user input selecting one or more of the logical database components identified in the backup view and a time; and
provide one or more of the logical identifiers and the time to the database recovery manager, wherein
the one or more of the logical identifiers identify the selected one or more of the logical database components.

11. The computer program product of claim 10, wherein the program instructions are further executable to:
issue a first database query to the database requesting the backup period; and
issue a second database query to the database requesting a current database schema, wherein
the backup period is a current backup period supported by the database recovery manager,
the backup view is generated based upon the backup period and the current database schema, and
the logical database components identified by the backup view comprise one or more components that were backed up during the current backup period and are part of the current database schema.

12. The computer program product of claim 10, wherein the program instructions are further executable to:
access information associated with a backed-up control file, wherein the information identifies the backup period;
initiate restoration of the backed-up control file; and
subsequent to restoration of the backed-up control file, provide the one or more of the logical identifiers and the time to the database recovery manager.

13. The computer program product of claim 10, wherein the program instructions are further executable to:
detect that the database recovery manager is initiating a new backup of the database; and
create one or more logical backup sets corresponding to the new backup, wherein creating the logical backup set comprises:
generating second commands to query the database recovery manager;
issuing the second commands to the database recovery manager, wherein
the second commands request one or more second logical identifiers corresponding to one or more second physical backup pieces generated in the new backup; and
storing the one or more second logical identifiers in the one or more logical backup sets.

14. A computing device comprising:
a processor; and
a memory coupled to the processor, wherein the memory stores program instructions executable by the processor to:
generate commands to query a database recovery manager;
issue the commands from a backup module to the database recovery manager, wherein
the commands request logical identifiers corresponding to one or more physical backup pieces generated during a backup of a database,
each of the logical identifiers identifies a respective one of a plurality of logical database components, and
the logical database components comprise at least one of a table space and a database control file;
receive the logical identifiers from the database recovery manager in response to the commands; and
generate a backup view for display to a user, based upon the logical identifiers, wherein
the backup view identifies logical database components that are available to be restored from one or more backups generated during a backup period;
receive user input selecting one or more of the logical database components identified in the backup view and a time; and
provide one or more of the logical identifiers and the time to the database recovery manager, wherein
the one or more of the logical identifiers identify the selected one or more of the logical database components.

15. The computing device of claim 14, wherein the program instructions are further executable to:
issue a first database query to the database requesting the backup period; and
issue a second database query to the database requesting a current database schema, wherein the backup period is a current backup period supported by the database recovery manager, the backup view is generated based upon the backup period and the current database schema, and the logical database components identified by the backup view comprise one or more components that were backed up during the current backup period and are part of the current database schema.

16. The computing device of claim 14, wherein the program instructions are further executable to:

access information associated with a backed-up control file, wherein the information identifies the backup period;

initiate restoration of the backed-up control file; and subsequent to restoration of the backed-up control file, provide the one or more of the logical identifiers and the time to the database recovery manager.

17. The computing device of claim 14, further program instructions executable to:

detect that the database recovery manager is initiating a new backup of the database; and create one or more logical backup sets corresponding to the new backup, wherein creating the logical backup set comprises:

generating second commands to query the database recovery manager;

issuing the second commands to the database recovery manager, wherein the second commands request one or more second logical identifiers corresponding to one or more second physical backup pieces generated in the new backup; and storing the one or more second logical identifiers in the one or more logical backup sets.

18. A system comprising:

means for generating commands to query a database recovery manager;

means for issuing the commands from a backup module to the database recovery manager, wherein the commands request logical identifiers corresponding to one or more physical backup pieces generated during a backup of a database, and each of the logical identifiers identifies a respective one of a plurality of logical database components, and the logical database components comprise at least one of a table space and a database control file;

means for receiving the logical identifiers from the database recovery manager in response to the commands;

means for generating a backup view based upon the logical identifiers, wherein the backup view identifies logical database components that are available to be restored from one or more backups generated during a backup period;

means for storing the generated backup view;

means for displaying the generated backup view to a user;

means for receiving user input selecting one or more of the logical database components identified in the backup view and a time; and means for providing one or more of the logical identifiers and the time to the database recovery manager, wherein the one or more of the logical identifiers identify the selected one or more of the logical database components.

* * * * *